United States Patent [19]

Suzuki et al.

[11] 4,277,088
[45] Jul. 7, 1981

[54] PASSIVE SEATBELT SYSTEM

[75] Inventors: Ichiro Suzuki, Nagoya; Masanao Motonami; Hisashi Ogawa, both of Toyota, all of Japan

[73] Assignee: Toyota Jidosha Kogyo Kabushiki Kaisha, Toyota, Japan

[21] Appl. No.: 33,054

[22] Filed: Apr. 25, 1979

[30] Foreign Application Priority Data

Aug. 17, 1978 [JP] Japan ............................ 53-113244[U]

[51] Int. Cl.$^3$ ........................................... B60R 21/10
[52] U.S. Cl. .................................. 280/804; 16/95 R
[58] Field of Search ...................... 280/804, 803, 802; 180/270, 268; 297/482, 483, 469; 74/30, 29; 16/93 D, 93 R, 91, 95 R, 95 D, 96; 104/93, 89, 110, 106, 165

[56] References Cited

U.S. PATENT DOCUMENTS

| 2,966,695 | 1/1961 | Dwyer ............................... 16/93 DS |
| 3,074,356 | 1/1963 | Parker et al. ........................ 16/95 R |
| 3,860,260 | 1/1975 | Kazaoka et al. ..................... 280/803 |
| 4,004,829 | 1/1977 | Kato et al. ........................... 280/802 |
| 4,039,224 | 8/1977 | Bauer et al. .......................... 280/804 |

Primary Examiner—John A. Pekar
Attorney, Agent, or Firm—Koda and Androlia

[57] ABSTRACT

A passive seatbelt system in which the outer end of the passenger restraining belt is anchored to an anchor shaft which projects from a runner piece. The runner piece is provided within a guide rail which is fastened to the vehicle body. The runner piece is moved along the length of the guide rail by driving mechanism as a result the belt approaches or moves away from the passenger. Since the runner piece is provided within the guide rail, the movement of the runner piece towards a vehicle interior is checked and the belt tension can be securely supported during a vehicular emergency.

11 Claims, 10 Drawing Figures

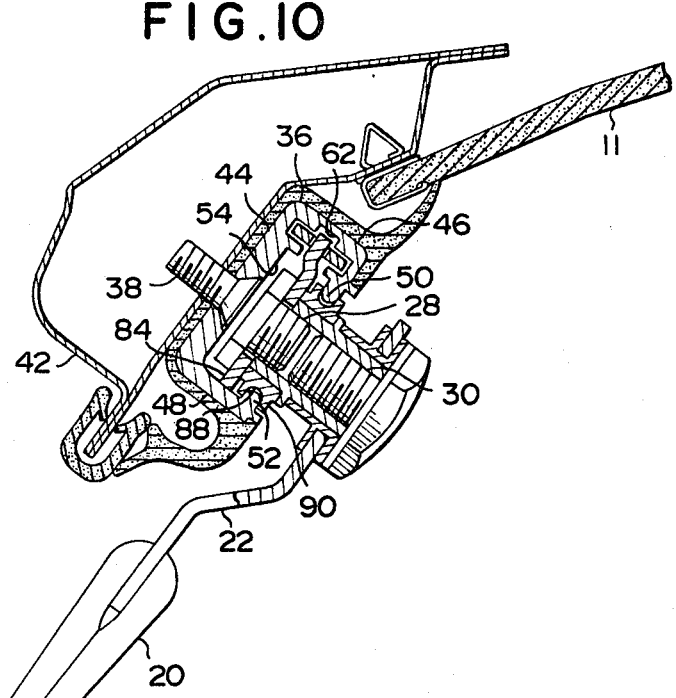
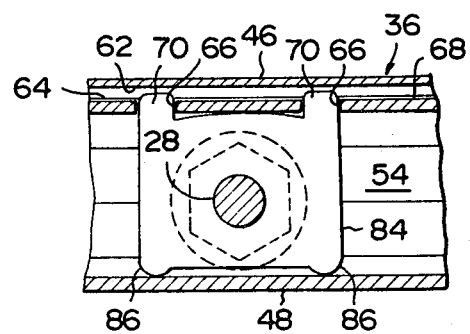

PASSIVE SEATBELT SYSTEM

BACKGROUND OF THE INVENTION

1. Field of the Invention

This invention relates to seatbelt systems and more particularly to passive seatbelt systems which automatically fasten the belt around the passenger after the passenger has seated himself in the vehicle.

2. Prior Art

Seatbelt systems restrain passengers and prevent them from colliding with dangerous objects during a vehicular emergency. As a result, such systems contribute to the safety of the passenger. However, the percentage of the passengers who wear seatbelt is extremely low because of difficulty in donning the seatbelts, etc. As a result, various types of passive seatbelt systems have been proposed which make it possible to automatically fasten the belt around the passenger after the passenger has seated himself in the vehicle.

Among these systems, passive seatbelt systems which cause the belt to approach or move away from the seated passenger by using the driving force of a motor to move a runner piece which anchors the outer end of the passenger restraining belt are able to provide a reliable operation. The movement of the runner is guided by a guide rail which is fastened to the roof side member for door, etc., of the vehicle. During a vehicular emergency, the tension applied to the belt by the passenger is transmitted to the runner piece. Accordingly, this runner piece must reliably support the belt tension and transmit the tension to the vehicle body. However, in cases where a large, strong runner piece is used, the passenger space in the vehicle is decreased. In such arrangements, furthermore, the runner piece becomes a large projecting moving object inside the passenger compartment. As a result, the passenger is prevented from comfortably entering and exiting the vehicle.

SUMMARY OF THE INVENTION

Accordingly it is a general object of the present invention to provide a passive seatbelt system in which the projection of the parts of the system into the passenger compartment is reduced.

It is still another object of the present invention to provide a runner piece for a passive seatbelt system which can reliably transmit the tension on the belt to the vehicle body.

In keeping with the principles of the present invention, the objects are accomplished by a unique passive seatbelt system which includes a runner piece provided within a guide rail so that movement of the runner piece towards the interior of the vehicle is prevented. As a result, the tension on the belt can be reliably transmitted to the vehicle body via the runner piece. One or more contact guide parts are provided on the vehicle-interior side of the runner piece and are in contact with the guide rail. Similarly, an anchor shaft is provided the vehicle interior side of the runner piece and the outer end of the belt is anchored to the anchor shaft. Furthermore, the anchor shaft projects out of the guide rail whereby as a result of this design the guide rail and runner piece are reduced in size.

BRIEF DESCRIPTION OF THE DRAWINGS

The above mentioned features and objects of the present invention will become more apparent with reference to the following description taken in conjunction with the accompanying drawings wherein like reference numerals denote like elements and in which:

FIG. 9 is a cross sectional view analogous to FIG. 3 which illustrates the second embodiment of the present invention; and FIG. 10 is a cross sectional view analogous to FIG. 4 which illustrates the second embodiment.

DETAILED DESCRIPTION OF THE INVENTION

Figure 1:
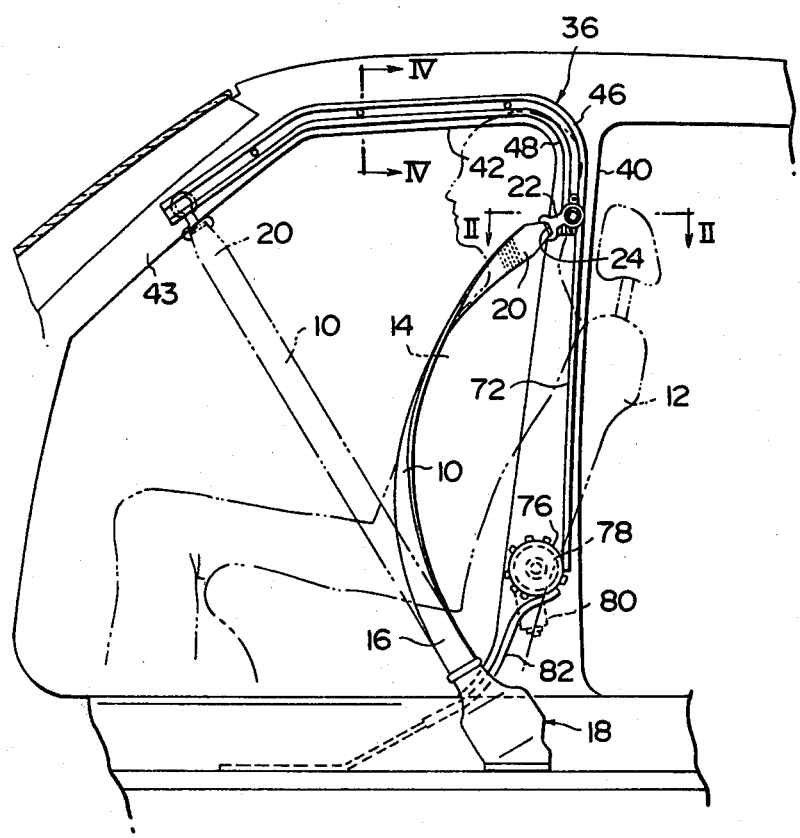
FIG. 1 is a side view illustrating a first embodiment of the passive seatbelt system in accordance with the teachings of the present invention.

Referring more particularly to the drawings, shown therein is a first embodiment of a passive seatbelt system. In FIG. 1, the passenger restraining belt 10 is fastened diagonally across the passenger 14 who is seated in the passenger seat 12. The inner end 16 of the belt 10 is power-retracted by a retractor mechanism 18 which is fastened to the floor of the vehicle. The retractor mechanism 18 is a so-called inertial locking retractor and contains an inertial locking mechanism which allows extension of the belt 10 against the retracting force under normal vehicle operating conditions, but abruptly stops extension of the belt during a vehicular emergency.

Figure 2:
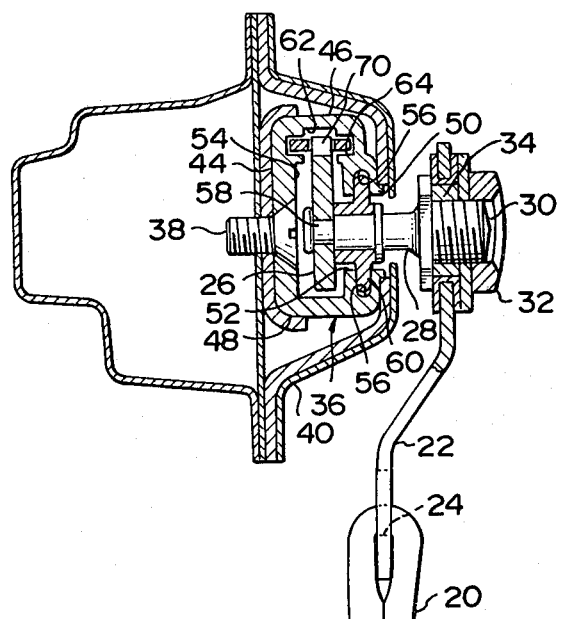
FIG. 2 is a cross sectional view along the line II—II in FIG. 1.
Figure 3:
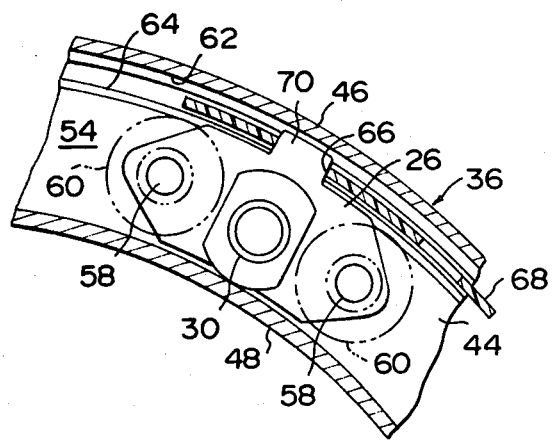
FIG. 3 is a cross sectional view illustrating the structure of a bent portion of the guide rail.
Figure 4:
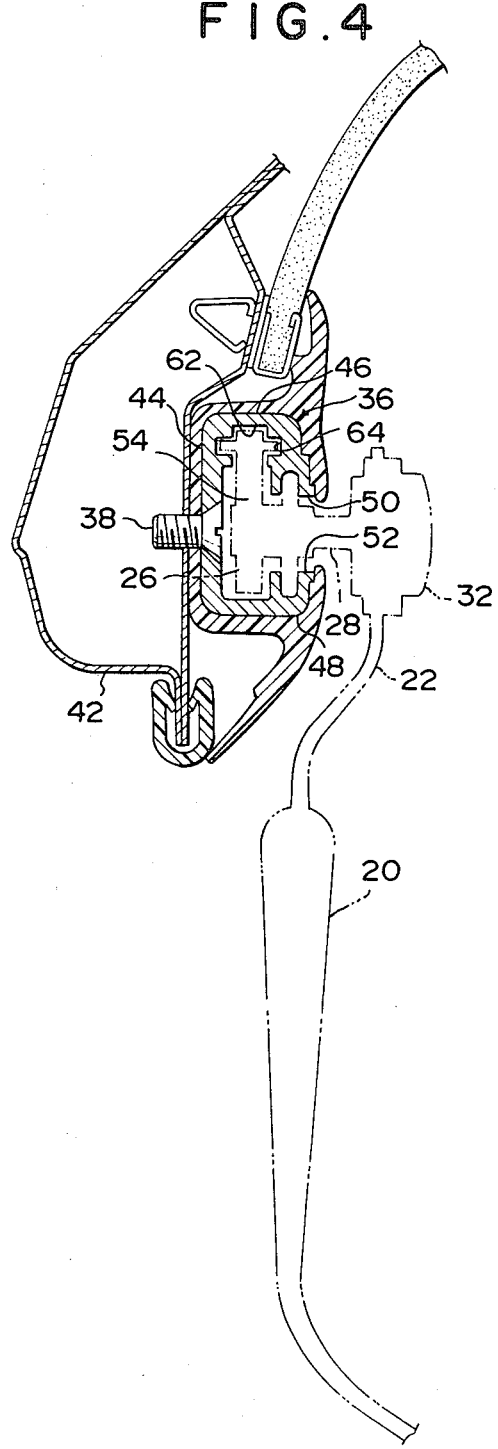
FIG. 4 is a cross sectional view along the line IV—IV in FIG. 1.

The outer end 20 of the belt 10 is anchored by being folded back on itself through a slot 24 in an anchor plate 22. This anchor plate 22 is fastened to an anchor shaft 28 and which is attached to a runner piece 26, as shown in FIGS. 2 and 3. The anchor plate 22 is fastened to the anchor shaft 28 by fitting the anchor plate 22 over the bolt 30 formed on the anchor shaft 28 and then tightening down a nut 32 on an anchor bolt 30. A spacer 34 is interposed between the anchor bolt 30 and the circumference of the bolt hole in the anchor plate 22 so that anchor plate 22 can rotate about the anchor bolt 30.

As is shown in FIG. 3, anchor shaft 28 is attached to the approximate center of the runner piece 26. Furthermore, the runner piece 26 is provided within a guide rail 36, as shown in FIG. 2. The guide rail 36 includes a base part 44 and a pair of guide arms 46 and 48 which are formed integrally with the base part 44. The guide rail 36 is fastened by means of screws 38 to the center pillar 40, roof side member 42 and front pillar 43 of the vehicle body. In a cross-sectional view, each of the guide arms 46 and 48 is integrally connected at one end to one edge of the base part 44 with the guide arm part 46 being connected to the top edge and the guide arm part 48 to the bottom edge. In addition, the guide arm parts 46 and 48 project towards the vehicle interior. The guide arm parts 46 and 48 are both bent at an intermediate point so that they are roughly L-shaped in cross section. Furthermore, the tip ends 50 and 52 of the parts 46 and 48 face each other and leave a narrow gap thereinbetween so that the anchor shaft 28 can move along the length of the guide rail 36. Thus, the guide rail is designed so that screws 38 are easily tightened down and the strength of the guide rail 36 is increased.

As a result of the above described design, a housing space 54 for the runner piece 26 is formed within the guide rail 36. The housing space 54 connects with the vehicle interior via the gap between the tip ends 50 and 52 of the guide arm parts 46 and 48. The anchor shaft 28 passes through this gap and the screws 38 project to the outside of the guide rail 36. Furthermore, in this embodiment, grooves 56 are formed in the tip ends 50 and 52 along the length of the guide rail 36 in order to form guide parts.

In addition, as is shown in FIG. 3, pair of shafts 58, which project toward the vehicle interior, are attached to the runner piece 26 on either side of the anchor shaft 28. Wheels 60, which constitute contact guide parts, are mounted on the shafts 58. These wheels 60 are rollingly provided in the grooves 56. The wheels 60 guide the runner piece 26 along the guide rail 36.

Figure 5:
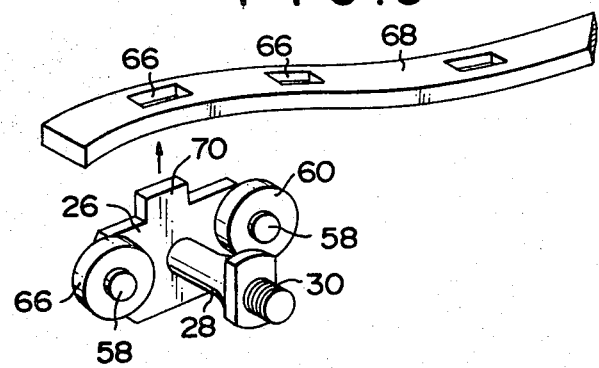
FIG. 5 is a partial oblique view illustrating the thick tape.
Figure 6:
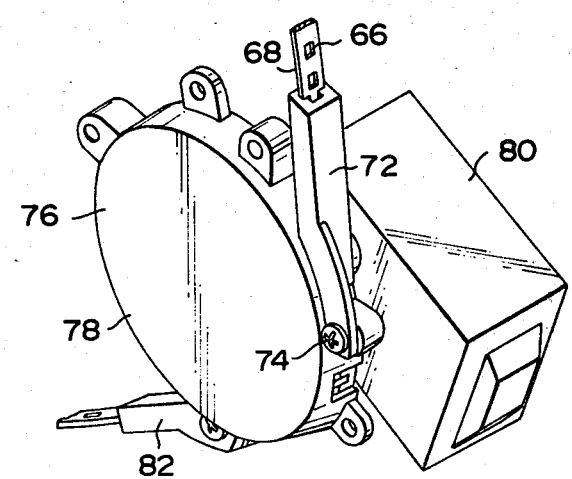
FIG. 6 is an oblique view illustrating a sprocket wheel.
Figure 7:
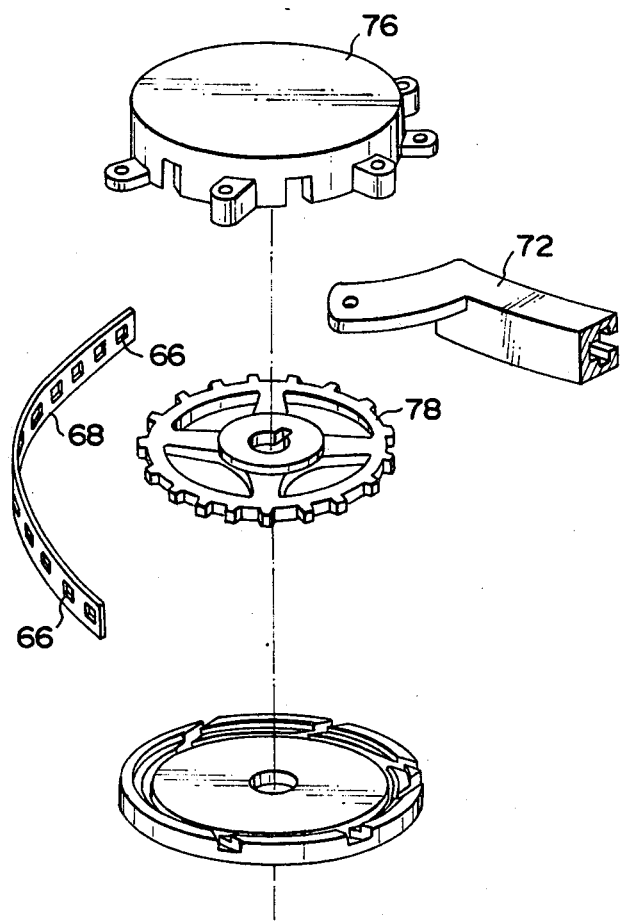
FIG. 7 is an exploded oblique view of FIG. 6.

Furthermore, a rectangular groove 62 is cut into the guide part 46 and communicates with the housing space 54. Two slide grooves 64, which substantially increase the width of the rectangular groove 62, are formed at an intermediate depth in both walls of the rectangular grooves 62. A thick tape 68 made of a synthetic resin, which has a plurality of rectangular openings 66 formed at a predetermined intervals along its length as shown in FIG. 5, is inserted into the slide grooves so that it can move through the slide grooves 64. As shown in FIG. 3, a projection 70 which projects from the central part of the runner piece 26 towards the guide arm 46, is inserted to one of the openings 66 in the thick tape 68. Accordingly, the runner piece 26 moves along with the thick tape 68. Since the runner piece 26 is thus connected to the thick tape 68 by the installation of the projection 70 on one edge of the runner piece 66, the length of the anchor shaft 28 from the runner piece 26 to the anchor bolt 30 can be reduced. As a result, the projection of the shaft 28 into the passenger compartment can be reduced.

Meanwhile, if the thick tape 68 is connected to the runner piece 26 at a point other than at the axis of the rotation of the wheel 60, there is a possibility that the rotational momentum applied to the runner piece 26 by the thick tape 68 will cause the wheel 60 to stick in the grooves 56. In this embodiment, however, two wheels are installed and as a result, the runner piece 26 can move smoothly through the guide rail 36.

As is shown in FIG. 1, the central portion of the guide rail 36 is fastened to the roof side member 42 and is oriented in a roughly horizontal direction. The front end of the guide rail 36 drops diagonally along the front pillar 43 of the vehicle, while the rear end of the guide rail 36 drops vertically along the center pillar 40 of the vehicle and ends at an intermediate point on the center pillar 40.

An extension 72 containing the rectangular groove 62 and slide grooves 64 extends vertically downwardly from the rear end of the guide rail 36 and is connected to a sprocket housing 76 which is fastened by means of fastening screws 74 to the lower part of the center pillar 40. A sprocket wheel 78 engages with the openings 66 and the thick tape 68 which is passed through the extension 72. Furthermore, the sprocket wheel 78 is connected with and driven by a reversible motor 80 which is installed within the center pillar 40. The reversible motor 80 operates such that when a passenger opens the door in order to enter or leave the vehicle, the sprocket wheel 78 is caused to complete a predetermined number of revolutions in a counterclockwise direction; and when a passenger closes the door after seating himself in the vehicle, the sprocket wheel 78 is caused to complete a predetermined number of revolutions in a clockwise direction.

Furthermore, a slide rail 82, which is the same shape as the extension 72, is connected to the sprocket housing 76. The slide rail 82 contains the thick tape 68 that is pushed out of the sprocket housing 76.

In operation, in FIG. 1 the passenger is seated in the vehicle and wearing the belt 10. The belt 10 is fastened diagonally across the passenger 14. For this situation and under normal vehicle operating conditions, the belt 10 is retracted by the force of the retractor mechanism 18. Accordingly, when the passenger wants to change his driving posture, the belt 10 can be extended from the retractor mechanism 18 against the retractor force of the mechanism 18. As a result, the passenger is able to achieve a comfortable driving posture.

If the vehicle is involved in an emergency such as a collision, etc., the inertial locking mechanism in the retractor mechanism 18 abruptly stops the extension of the inner end 16 of the belt 10. Accordingly, the passenger is securely restrained by the belt 10 so that his safety is ensured. During such an emergency, the large tension applied to the belt 10 by the passenger acts on the outer end 20 of the belt 10. As a result, there is the possibility of damage to wheels 60. However, since the movement of the runner piece 26 toward the vehicle interior is checked by the guide arm parts 46 and 48, the belt tension acting on the outer end 20 of the belt 10 is securely transmitted to the center pillar 40 and the safety of the passenger is ensured. Furthermore, in this embodiment, the rear end of the guide rail 36 is oriented vertically along the center pillar 40. As a result, there is no movement of the runner piece 26 along the length of the guide rail 36 and there is no danger that the belt 10 will become unfastened.

Next, when the passenger opens the door in order to leave the vehicle, the motor 80 causes the sprocket wheel 78 to rotate in a counterclockwise direction. This causes the thick tape 68 to be pushed out of the sprocket housing 76 into the extension 72 so that the thick tape 68 receives a compressive force. As a result, the rotational force of the sprocket wheel 78 is transmitted to the runner piece 26. Accordingly, the runner piece 26 reaches the position indicated by the two dot chain line in FIG. 1. As a result, a sufficient space for the passenger to leave the vehicle is formed between the belt 10 and the passenger seat 12 and the passenger can easily leave the motor vehicle.

Furthermore, when the passenger closes the door after reentering the vehicle and seating himself in the passenger seat, the motor 80 is reversed and the belt 10 is caused to move once again into the position indicated by the solid line in FIG. 1. As a result, the belt 10 is fastened securely around the passenger.

Since two wheels 60 are provided, the movement of the runner piece 26 along the guide rail 36 is very smooth and the runner piece 26 can be caused to move along the guide rail 36 with a high degree of reliability. In particular, even in cases where the intermediate portion of the guide rail 36 are bent as they are in this embodiment, the runner piece 26 can be easily caused to move.

Figure 8:
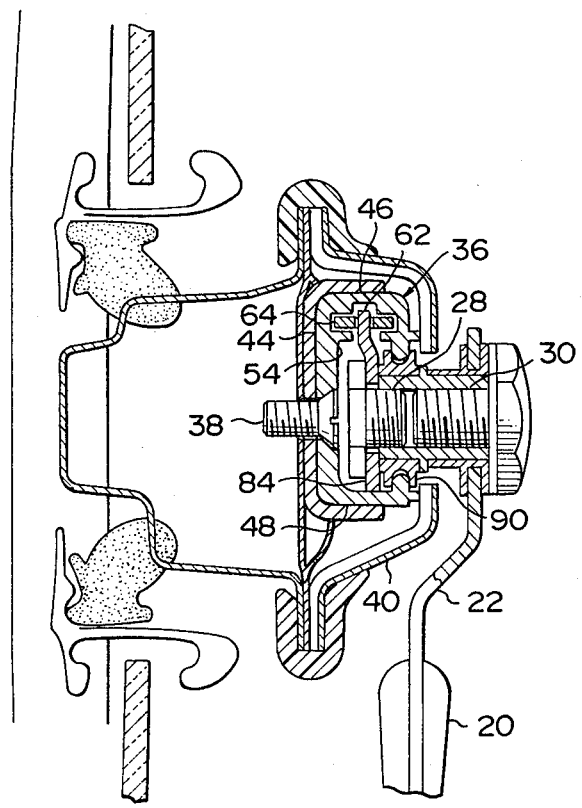
FIG. 8 is a cross sectional view analogous to FIG. 2 which illustrates the second embodiment of the present invention.

Referring more particularly to FIGS. 8 through 10, shown therein is a second embodiment of the present invention. In this second embodiment, two projections 70 project from the runner piece 84 and engage with openings 66 in the thick tape 68. Furthermore, slide projections 86 project from the runner piece 84 on the opposite side of the runner piece 84 from the projections 70. These slide projections 86 contact the inner surface of the guide arm part 48.

In this second embodiment, furthermore, a sliding shoe 90, which has grooves 88 formed in its outside edges is mounted on the anchor shaft 28 attached to the central portion of the runner piece 84. These grooves 88 accommodate the tip ends 50 and 52 of the guide arm parts 46 and 48. Accordingly, in this embodiment, the movement of the runner piece 84 towards the vehicle interior is checked by the guide arm parts 46 and 48 even when there is a large tension acting on the belt 10. As a result, the tension acting on the outer end 20 of the belt 10 is securely transmitted to the center pillar 40 and the safety of the passenger is ensured.

The remainder of the second embodiment is substantially the same as the first embodiment and like reference numerals are given like elements and the description of their interconnection and operation is omitted.

Furthermore, in each of the embodiments described above, this invention was described in terms of being applied to seatbelt system using a bent guide rail. However, this invention can be applied to any seatbelt system in which the belt 10 is automatically fastened around and removed from the passenger by the movement of a runner piece which anchors the outer end of the belt 10. Furthermore, in the embodiments described above, a thick tape was used as a connecting part in order to connect the runner piece with the motor 80 which was used as a driving mechanism. However, this invention is not limited to such an arrangement and it would also be possible to use some other connecting parts such as a wire, etc.

As is described above, the passive seatbelt system provided by this invention is designed such that a runner piece is provided within a guide rail and one or more contact guide parts which contact the guide rail are installed on the vehicle-interior side of the runner piece. Furthermore, an anchor shaft is installed in the vehicle-interior side of the runner piece. In addition, an anchor shaft is provided on the vehicle-interior side of the runner piece and is caused to project towards the exterior of the guide rail. The outer end of the belt is anchored to the anchor shaft. Therefore, as a result of the above design, this invention possesses advantages as follows: The projection of parts of the passive seatbelt system into the passenger compartment is reduced and the outer end of the belt can be securely supported on the vehicle body.

It should be apparent to one skilled in the art that the above described embodiments are merely illustrative of but a few of many possible specific embodiments which represent the applications of the principles of the present invention. Numerous and varied other arrangements can be readily devised by those skilled in the art without departing from the spirit and scope of the invention.

We claim:

1. A passive seatbelt system for a vehicle which includes a guide rail fastened to a vehicle body, a runner piece which is provided in said guide rail and which moves along the length of said guide rail, a belt driving member provided in said guide rail and coupled to said belt and a driving mechanism which moves said belt driving member and said runner piece along the length of said guide rail, said seatbelt system further comprising guide part means housed in said guide rail between said runner piece and said guide rail to guide said runner piece along said guide rail and hold said runner piece inside of said guide rail, and an anchor shaft secured to said runner piece, said anchor shaft projecting through said guide rail to the inside of the vehicle, a belt anchor secured to a portion of said anchor shaft projecting to the inside of the vehicle for anchoring the outer end of a passenger restraining belt, whereby the movement of said runner piece is prevented in a lateral direction of the vehicle and smooth movement of said runner piece along said guide rail is assured.

2. A passive seatbelt system according to claim 1, wherein an anchor plate is rotatably mounted on said anchor shaft and the outer end of the belt is anchored to said anchor plate.

3. A passive seatbelt system according to claim 1, wherein a pair of shafts are provided on said runner piece on either side of said anchor shaft and said pair of shafts support said guide part means.

4. A passive seatbelt system according to claim 3, wherein said guide part means are a pair of wheels.

5. A passive seatbelt system according to claim 4, wherein said wheels are guided in grooves formed in said guide rail.

6. A passive seatbelt system according to claim 1 further comprising a projection formed on said runner piece and a flexible tape having a plurality of openings provided thereon which engage with said projection on said runner piece to transmit driving force to said runner piece from said driving mechanism.

7. A passive seatbelt system according to claim 1, wherein said guide part means is a sliding shoe which is provided on said anchor shaft.

8. A passive seatbelt system according to claim 7, further comprising grooves formed on the edge of said sliding shoe and portions of said guide rail are inserted into said grooves such that the sliding shoe guides the movement of said runner piece.

9. A passive seatbelt system according to claim 8, in which a pair of projections are formed on said runner piece and said runner piece is coupled to said driving mechanism via said projections.

10. A seatbelt according to claim 1, wherein said guide part means and said runner piece are disposed parallel to each other in a longitudinal direction of the guide rail.

11. A passive seatbelt system comprising for a vehicle which includes a guide rail fastened to a vehicle body, a runner piece which is provided in said guide rail and moves along the length of said guide rail and a driving mechanism which moves said runner piece along the length of said guide rail, said seatbelt system further comprising:
- a sliding shoe provided between said runner piece and said guide rail, said sliding shoe comprising grooves formed on the edge thereof and portions of said guide rail being inserted into said grooves such that the sliding shoe guides the movement of said runner piece;
- a pair of projections formed on said runner piece through which said runner piece is coupled to said driving mechanism by engaging with a transmitting tape;

a pair of slide projections formed on said runner piece on the other side opposite to said pair of projections whereby said runner piece contacts said guide rail via said slide projections; and an anchor shaft attached to said runner piece, said anchor shaft projecting through said guide rail to the inside of the vehicle for anchoring the outer end of a passenger restraining belt, whereby the movement of said runner piece is prevented in a lateral direction of the vehicle.

* * * * *